United States Patent
Boulton

(10) Patent No.: US 11,210,403 B2
(45) Date of Patent: Dec. 28, 2021

(54) DETERMINING SECURITY RISKS IN BINARY SOFTWARE CODE BASED ON NETWORK PROTOCOLS

(71) Applicant: BlackBerry Limited, Waterloo (CA)

(72) Inventor: Adam John Boulton, Wirral (GB)

(73) Assignee: BlackBerry Limited, Waterloo (CA)

( * ) Notice: Subject to any disclaimer, the term of this patent is extended or adjusted under 35 U.S.C. 154(b) by 299 days.

(21) Appl. No.: 16/353,209

(22) Filed: Mar. 14, 2019

(65) Prior Publication Data
US 2020/0293665 A1    Sep. 17, 2020

(51) Int. Cl.
*H04L 9/00*     (2006.01)
*G06F 21/57*    (2013.01)
*H04L 29/06*    (2006.01)

(52) U.S. Cl.
CPC ........ *G06F 21/577* (2013.01); *H04L 63/1425* (2013.01); *H04L 63/1433* (2013.01); *H04L 63/20* (2013.01); *G06F 2221/033* (2013.01)

(58) Field of Classification Search
CPC   G06F 21/577; H04L 63/1425; H04L 63/1433
USPC ........................................................ 726/25
See application file for complete search history.

(56) References Cited

U.S. PATENT DOCUMENTS

| | | | | |
|---|---|---|---|---|
| 10,855,723 | B2 * | 12/2020 | Kupisiewicz | H04L 63/166 |
| 2016/0094575 | A1 * | 3/2016 | Shekyan | H04L 63/168 |
| | | | | 726/25 |

OTHER PUBLICATIONS

Backes et al., "AppGuard-fine-grained policy enforcement for untrusted Android applications." Data Privacy Management and Autonomous Spontaneous Security, Springer, Berlin, Heidelberg, Sep. 12, 2013, 30 pages.
Davis et al., "RetroSkeleton: retrofitting android apps." Proceeding of the 11th annual international conference on Mobile systems, applications, and services, Jun. 25, 2013, 12 pages.
Extended European Search Report issued in European Application No. 20160544.1 dated Jul. 27, 2020, 9 pages.
Ki et al., "Reptor: Enabling api virtualization on android for platform openness." Proceedings of the 15th Annual International Conference on Mobile Systems, Applications, and Services, Jun. 16, 2017, 14 pages.
EP Communication pursuant to Article 94(3) issued in European Application No. 20160544.1 dated Jul. 13, 2021, 7 pages.

* cited by examiner

*Primary Examiner* — Christopher J Brown
(74) *Attorney, Agent, or Firm* — Fish & Richardson P.C.

(57) ABSTRACT

Systems, methods, and software can be used to analyze security risks of a binary software code. In some aspects, a computer-implemented method comprises: receiving, by at least one hardware processor, a binary software code; determining, by the at least one hardware processor, that the binary software code accesses one or more network addresses; for each of the one or more network addresses that are accessed by the binary software code: determining, by the at least one hardware processor, whether the binary software code uses an insecure network protocol to access the network address; and generating, by the at least one hardware processor, a security notification indicating the network address that is accessed by the binary software code using the insecure network protocol.

20 Claims, 2 Drawing Sheets

DETERMINING SECURITY RISKS IN BINARY SOFTWARE CODE BASED ON NETWORK PROTOCOLS

TECHNICAL FIELD

The present disclosure relates to determining security risks in binary software code based on network protocols.

BACKGROUND

In some cases, software services can be provided by executable binary software code. The binary software code is computer software in a binary format. The computer software can be application software, system software (e.g., an operating system or a device driver), or a component thereof.

The binary software code can be in a configuration of object code, executable code, or bytecode. An object code is the product of compiler output of a sequence of statements or instructions in a computer language. Computer programs can be written with source code that is logically divided into multiple source files. Each source file is compiled independently into a corresponding object file that includes object code. The object codes in the object files are binary machine codes, but they may not be ready to be executed. The object files can include incomplete references to subroutines outside itself and placeholder addresses. During the linking process, these object files can be linked together to form one executable file that includes executable code that can be executed on a computing device. During the linking process, the linker can read the object files, resolve references between them, perform the final code layout in the memory that determines the addresses for the blocks of code and data, fix up the placeholder addresses with real addresses, and write out the executable file that contains the executable code.

A bytecode, also referred to as portable code or p-code, is a form of instruction set designed for efficient execution by a software interpreter. Bytecodes include compact numeric codes, constants, and references (normally numeric addresses) that encode the result of compiler parsing and performing semantic analysis of things like type, scope, and nesting depths of program objects. The bytecode includes instruction sets that have one-byte opcodes followed by optional parameters. Intermediate representations such as the bytecode may be output by programming language implementations to ease interpretation, or it may be used to reduce hardware and operating system dependence by allowing the same code to run cross-platform, on different devices. The bytecode may often be either directly executed on a virtual machine (a p-code machine i.e., interpreter), or it may be further compiled into machine code for better performance. In some cases, binary software code that is coded using platform-independent languages such as JAVA can be stored in the bytecode format.

DESCRIPTION OF DRAWINGS

Like reference numbers and designations in the various drawings indicate like elements.

DETAILED DESCRIPTION

In some cases, a software developer can submit software code to a software service platform that is operated by a software provider. The software code can be executed on the software service platform to provide software services to user devices. Alternatively or additionally, the software code can be downloaded to user devices. The software service platform can be implemented in one or more servers, or on a cloud-computing platform.

In some implementations, the software code can use an insecure network protocol to access network addresses. Using the insecure network protocol can impose security risks to the devices that execute the software code or obtain software service provided by the software code. If the binary software code is submitted without the source code, it may be difficult to inspect the binary software code to identify the network protocols that are used to access network addresses. The binary software code can include a stream of bytes that are generated by compiling the source code of the software. Thus, the binary software code is not in a readable format and cannot be easily parsed or analyzed.

Figure 1:
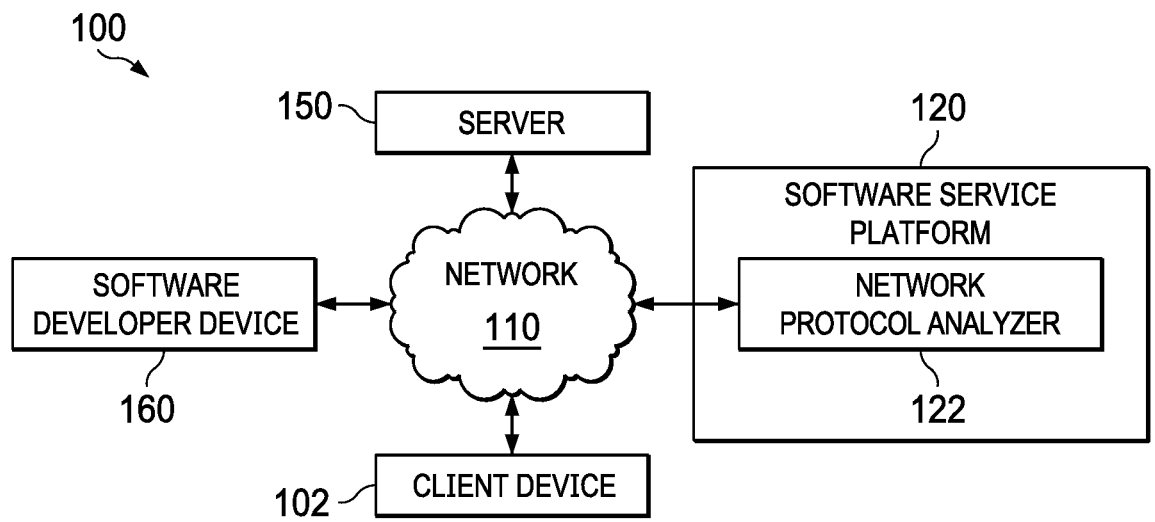
FIG. 1 is a schematic diagram showing an example communication system that determines security risks of binary software code based on network protocols, according to an implementation.
Figure 2:
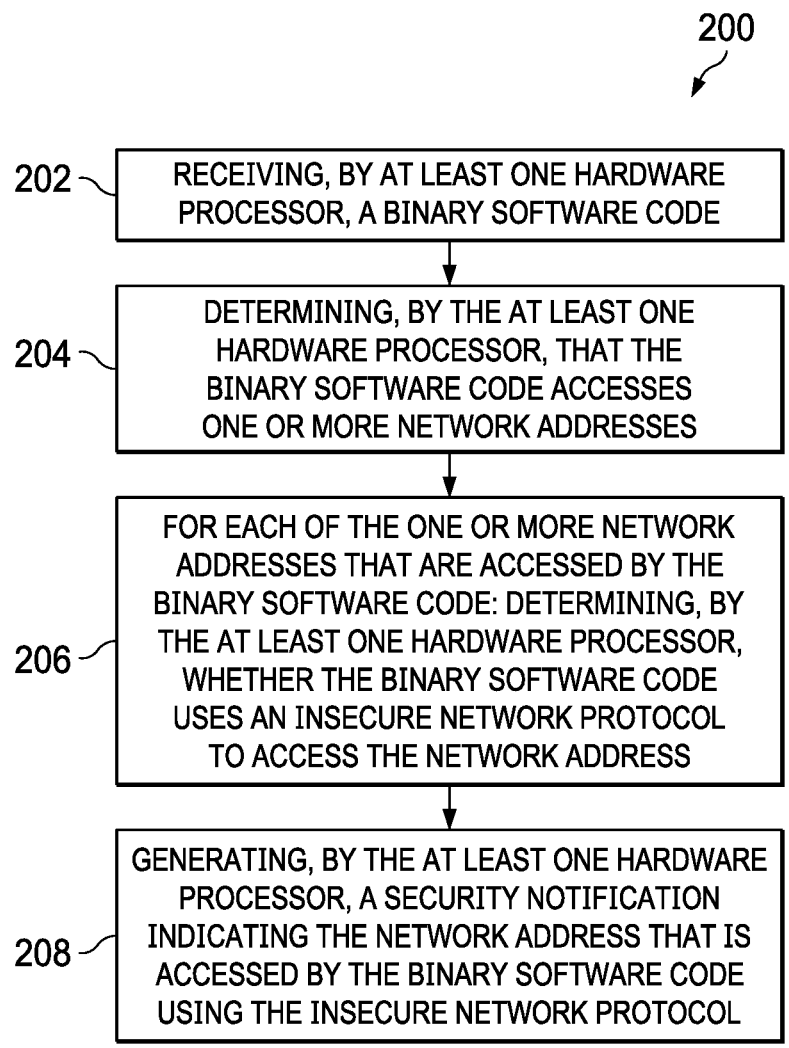
FIG. 2 is a flow diagram showing an example method that determines security risks of binary software code based on network protocols, according to an implementation.
Figure 3:
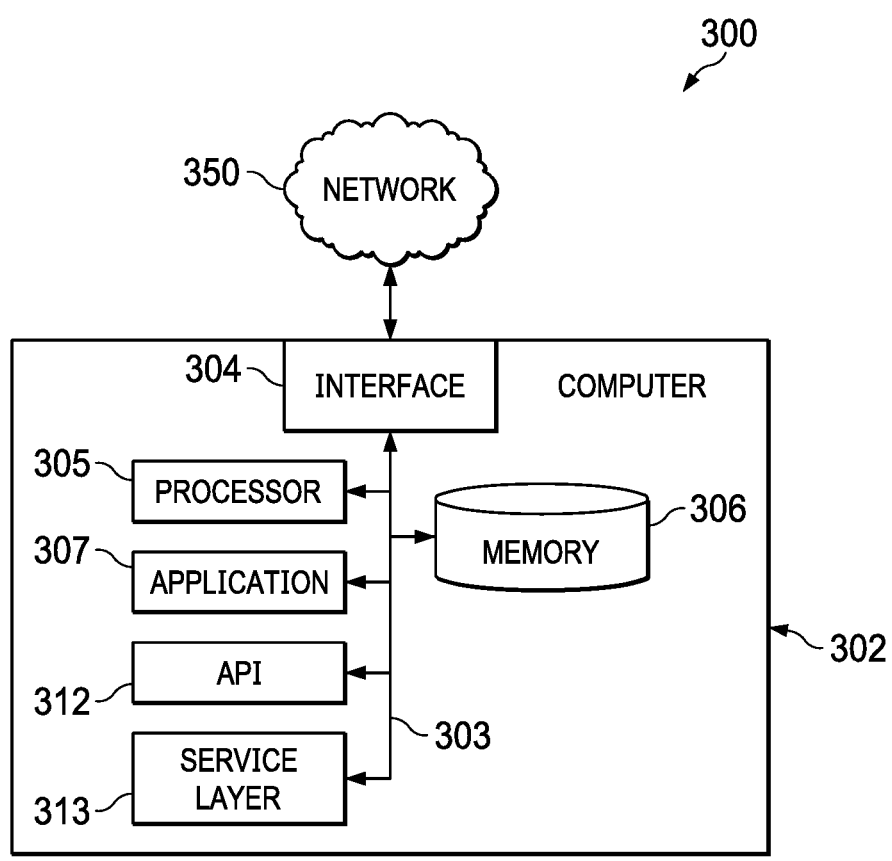
FIG. 3 is a high-level architecture block diagram of a computing system, according to an implementation.

In some implementations, one or more network addresses that are included in a binary software code can be identified. The binary software code can be the binary software code of a software program, a portion of a software program, or multiple software programs. These network addresses can indicate network entities, e.g., a server, that the binary software code may have access to when the binary software code is executed. The network protocols that the binary software code uses to access these network entities can be identified. Whether these network protocols are secure can be determined. A security notification can be generated to indicate whether insecure network protocols are used. In one implementation, whether these network entities can be accessed using corresponding secure network protocols can be determined. The binary software code can be patched to replace the insecure network protocols with corresponding secure network protocols. FIGS. 1-3 and associated descriptions provide additional details of these implementations. By performing a dynamic assessment of the security risks based on the network protocols used by the binary software code, the security risks of the binary software code can be determined without executing the binary software code, and the binary software code can be modified to improve security.

FIG. 1 is a schematic diagram showing an example communication system 100 that determines security risks of binary software code based on network protocols, according to an implementation. At a high level, the example communication system 100 includes a client device 102, a software developer device 160, a server 150, and a software service platform 120 that are communicatively coupled with a network 110.

The software developer device 160 represents an application, a set of applications, software, software modules, hardware, or any combination thereof, that can be configured to submit the binary software code to the software service platform 120. The binary software code can be downloaded to the client device 102 to be exacted on the client device 102. The binary software code can also be executed on the software service platform 120 to provide software service to the client device 102. Examples of the software services can include software as a service (SaaS) applications such as SALESFORCE, OFFICE 365, or other software application services.

The software service platform 120 includes a network protocol analyzer 122. The network protocol analyzer 122 represents an application, a set of applications, software, software modules, hardware, or any combination thereof, that can be configured to analyze software code for security risks based on network protocols used by the binary software code to access network addresses. In some implementations, the network protocol analyzer 122 can identify one or more network addresses included in the binary software code, determine whether the network protocol used by the binary software code to access network address is secure or insecure, generate security notifications, and patch the binary software code. FIGS. 2-3 and associated descriptions provide additional details of these implementations.

The software service platform 120 can be implemented using one or more computers, computer servers, or a cloud-computing platform.

The server 150 represents an application, a set of applications, software, software modules, hardware, or any combination thereof, that can be accessed by the binary software code when executed. The server 150 can be an application server, a service provider, or any other network entity that can be accessed at a network address included in the binary software code. The server 150 may configure one or more access procedures for a device, e.g., the client device 102 or the software service platform 120, to establish a network connection with the server 150. The server 150 can be implemented using one or more computers, computer servers, or a cloud-computing platform. In some implementations, the software service platform 120 can send an access request to the server 150, and receive an access response from the server 150. The software service platform 120 can determine whether the server 150 can be accessed using a secure network protocol based on the access response. FIGS. 2-3 and associated descriptions provide additional details of these implementations.

The client device 102 represents a device that can use the binary software code. In some cases, the binary software code can be installed on the client device 102, e.g., by downloading over the network 110 or copying locally onto the client device 102. Alternatively, the client device 102 can access a software service provided by the binary software code. In one example, a browser or a client application can be executed on the client device 102 to communicate service requests and service responses with the software service platform 120 to obtain software services.

Turning to a general description, the client device 102 may include, without limitation, any of the following: endpoint, computing device, mobile device, mobile electronic device, user device, mobile station, subscriber station, portable electronic device, mobile communications device, wireless modem, wireless terminal, or other electronic device. Examples of an endpoint may include a mobile device, IoT (Internet of Things) device, EoT (Enterprise of Things) device, cellular phone, personal data assistant (PDA), smart phone, laptop, tablet, personal computer (PC), pager, portable computer, portable gaming device, wearable electronic device, health/medical/fitness device, camera, vehicle, or other mobile communications devices having components for communicating voice or data via a wireless communication network. A vehicle can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used interchangeably herein.

The example communication system 100 includes the network 110. The network 110 represents an application, set of applications, software, software modules, hardware, or a combination thereof that can be configured to transmit data messages between the entities in the system 100. The network 110 can include a wireless network, a wireline network, the Internet, or a combination thereof. For example, the network 110 can include one or a plurality of radio access networks (RANs), core networks (CNs), and the Internet. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, the fifth generation (5G), or any other radio access technologies. In some instances, the core networks may be evolved packet cores (EPCs).

A RAN is part of a wireless telecommunication system which implements a radio access technology, such as UMTS, CDMA2000, 3GPP LTE, 3GPP LTE-A, and 5G. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

While elements of FIG. 1 are shown as including various component parts, portions, or modules that implement the various features and functionality, nevertheless, these elements may, instead, include a number of sub-modules, third-party services, components, libraries, and such, as appropriate. Furthermore, the features and functionality of various components can be combined into fewer components, as appropriate.

FIG. 2 is a flow diagram showing an example method 200 that determines security risks of binary software code based on network protocols, according to an implementation. The method 200 can be implemented by a software service platform, e.g., the software service platform 120 shown in FIG. 1. The method 200 shown can also be implemented using additional, fewer, or different entities. Furthermore, the method 200 can be implemented using additional, fewer, or different operations, which can be performed in the order shown or in a different order.

The example method 200 begins at 202, where a binary software code is received. In some cases, the binary software code is received at a software service platform. In one example, the binary software code can be submitted to the software service platform by a software developer, over a network. The binary software code can represent an application software, a system software (e.g., an operating system or a device driver), or a component thereof. The binary software code can be received without the corresponding source code of the software.

At 204, the software service platform determines that the binary software code accesses one or more network addresses. In some cases, the software service platform can scan the binary software code to identify text strings that are encoded in the binary software code using one or more encoding protocols. Examples of the encoding protocols include the American Standard Code for Information Interchange (ASCII) encoding protocol or the Unicode protocol. A text string includes one or more consecutive text characters. Examples of the text characters include alphabetic letters, numbers, punctuation marks, and symbols. In some cases, a text character can also be referred to as an alphanumeric character. Each text character is encoded into a binary number according to an encoding protocol. The size of the binary number can be 8 bits (1 byte), 16 bits (2 bytes), 32 bits (4 bytes), or 64 bits (8 bytes). For example, in ASCII protocol, the lower case letter "a" is encoded as 0x61, or "01100001" in binary number. In an encoding protocol, text characters are defined within a range of binary numbers. Therefore, by scanning the byte stream of the binary software code to check the values of each byte, two bytes, four bytes, or eight bytes (depending on the size of binary number of the encoding protocol), different text characters can be identified. For text characters that appear consecutively in the binary software code, these text characters form a text string. In some cases, the scanning can be performed from the beginning of the binary software code (forward scanning), from the end of the binary software code (backward scanning), or from both the beginning and the end of the binary software code (parallel scanning).

In some cases, the identified text strings that are encoded in the binary software code can be used to determine one or more network addresses at which the binary software code may perform a network communication. For example, the text strings can include an email address or a Uniform Resource Locator (URL). These text strings can be identified based on a specific character or a specific character string. For example, an email address can be identified by the "@" character in the text string. A URL can be identified by the "HTTP," "HTTPS," or "FTP" characters in the text string. If such a specific character or character string is found in the text strings, the text strings can be parsed to determine a network address. For example, the portion of the text string after the specific character "@" can represent a network address of an email server. The portion of the text string after the specific character string "HTTPS" or "HTTP" can represent a network address of a web server. In one example, the portion of the text string that represents the network address can be in numerical form, e.g., an Internet Protocol (IP) v4 or v6 address. In another example, the portion of the text string that represents the network address can be in letter form, e.g., a Domain Name System (DNS) address that can be translated into an IP address by a DNS server.

In some implementations, the software service platform can determine a configuration of the binary software code. The configuration of the binary software code can be object code, executable code, or bytecode. In some cases, the software developer can submit the binary software code in the configuration of object code. In these cases, the binary software code can be a collection of multiple object files that are compressed into one archive file, e.g., a zip file. Alternatively, the software developer can perform the link process and submit the executable file containing executable code. In some cases, e.g., if the binary software code was developed using JAVA, the software developer can submit the binary software code in a bytecode configuration. The software service platform can determine the configuration based on the types of the file in which binary software code is submitted. For example, if the binary software code is submitted in a zip file, the software service platform can determine that the binary software code is in an object code configuration. If the binary software code is submitted in an .exe file, the software service platform can determine that the binary software code is in an executable code configuration. Alternatively or in combination, the software service platform can determine the configuration by scanning the first few bytes of the binary software code. The first few bytes of the binary software code can be the header, which stores configuration information of the binary software code.

In some cases, based on the determined configuration, the software service platform can further extract a segment of the binary software code that stores constant values used by the binary software code. For example, if the binary software code is in the object code configuration, the software service platform can decompress the binary software code to obtain a collection of object files. The collection of object files can include a data segment, in some cases stored as a .data or a .h file, that stores constant values. Therefore, the software service platform can locate the data segment by searching for .data or .h file in the collection of object files. In some cases, there can be more than one data segments in the binary software code.

If the binary software code was developed using JAVA, the binary software code may be in a bytecode configuration. In these cases, the configuration information in the header of the binary software code can indicate information of one or more constant tables that store constants used by the binary software code. The information can include locations of the constant tables and the numbers of entries in the constant tables. Based on the configuration information, the software service platform can extract the constant tables from the binary software code.

If the software service platform extracts data segments that include the constant values, the software service platform can scan these data segments to identify network addresses used by the binary software code. Comparing to scanning the entire binary software code for network addresses, this approach simplifies the scanning process, and therefore saves time and computing resources. In some cases, e.g., the binary software code is submitted in an executable file and the binary software code was developed using native languages such as C, the software service platform may not be able to extract these data segments. In these cases, the software service platform can scan the entire binary software code to determine network addresses that are accessed by the binary software code.

In some implementations, in addition to, or as an alternative to, the scanning of the binary software code, the binary software code can be disassembled into assembly code. The assembly code can be parsed into different assembly instructions. The software service platform can search the assembly instructions to determine network addresses that are accessed by the binary software code.

At 206, for each of the network addresses determined at step 204, the software service platform determines whether an insecure network protocol is used to access the network address. The software service platform can determine the network protocol used to access the network address based on the text string found for the network address at step 204. The text string can include a set of specific characters that represent the network protocol used to access the network address. Examples of the set of specific characters can include "HTTP," "HTTPS," "FTP," "FTPS," "STFP," which indicates that Hypertext Transfer Protocol (HTTP), Hypertext Transfer Protocol Secure (HTTPS), File Transfer Protocol (FTP), File Transfer Protocol Secure (FTPS), and Secure File Transfer Protocol (SFTP) are used, respectively. Among these network protocols, examples of insecure network protocols include HTTP and FTP, while examples of secure network protocols include HTTPS, FTPS, and SFTP. In some cases, a list of secure and insecure network protocols can be stored at the software service platform. The software service platform can determine whether a network protocol is secure or insecure based on the list.

At 208, the software service platform generates a security notification. The security notification can list the network addresses that is accessed by the binary software code using insecure network protocols.

In some cases, the software service platform can also determine whether the network addresses included in the security notification can be accessed by using a secure network protocol. For example, for a network address accessed by the binary software code using an insecure network protocol, the software service platform can transmit an access request directed to the network address by using a corresponding secure network protocol. The HTTPS is a secure network protocol corresponding to the insecure network protocol HTTP. FTPS or SFTP is a secure network protocol corresponding to the insecure network protocol FTP. Therefore, if the binary software code uses HTTP to access a network address, the software service platform can transmit an HTTPS command, e.g., HTTPS GET or HTTPS POST, to the network address. In response, the software service platform can receive an access response. The access response can indicate whether the network node at the network address accepts the access request using the secure network protocol. For example, if the response to the HTTPS GET or HTTPS POST is HTTPS 302 OK, the software service platform can determine that the network address can be accessed using the secure network protocol HTTPS. In some cases, for each insecure network protocol, the type of access request (e.g., the particular HTTPS command) using secure network protocol and the corresponding access responses indicating successful access can be stored in a list at the software service platform. Accordingly, the software service platform can select the type of access request and determine whether the access is successful based on the list.

In some implementations, the access request can initiate one or more security procedures configured by the network node at the network address. Example of the security procedure can include a Transport Layer Security (TLS) handshake procedure. The network node can use the TLS protocol to exchange information such as a certificate, encryption configuration, and authentication configuration with the entity that attempts to access the network node. In some cases, the software service platform can determine that the network address can be accessed using the secure network protocol based on a successful completion of the TLS handshake procedure, in addition to, or as an alternative to, receiving an access response that indicates a successful access.

In some cases, in addition to listing, in the security notification, the network addresses that are accessed by the binary software code using an insecure network protocol, the software service platform can include the information of whether the network addresses can be accessed using a corresponding secure network protocol based on the determination procedure discussed previously.

In some cases, the security notification can be outputted at the software service platform, e.g., displayed on a graphic user interface on the software service platform. This approach enables an enterprise that operates the software service platform to be informed of security risks of the software submitted to the platform. In some cases, the enterprise that operates the software service platform can enforce policies regarding the software security of codes on the platform. For example, the software service platform can include, or be coupled with, an app store for a device to download the software code, or a software as a service (SaaS) server that provides software service using the software code. If the security notification indicates that the binary software code uses an insecure network protocol to access network addresses, the software service platform can prevent the binary software code from being available to devices for use or download.

Alternatively or additionally, the security notification can be transmitted to the software developer device that submits the binary software code. This approach enables the software developer to make modifications accordingly.

In some cases, the software service platform can also perform patches on the binary software code that uses an insecure network protocol. For example, the software service platform can use the same encoding protocol (e.g., ASCII or unicode) that was used by the binary software code to encode the corresponding secure network protocol. The software service platform can replace the set of characters representing insecure network protocol (e.g., HTTP or FTP), with the encoded characters representing the corresponding secure network protocol (e.g., HTTPS, FTPS, or SFTP). In some cases, as discussed previously, the software service platform can extract the segments that store constant values, e.g., data segment file or constant table. The software service platform can thus patch the binary software code by replacing the characters representing an insecure network protocol with the corresponding secure network protocol in the data segment file or constant tables. In some cases, the software service platform can perform the patches only for the network addresses that are determined to be accessible using the corresponding secure network address.

In some cases, e.g., if the binary software code is in an executable code configuration and the binary software code was developed using native languages such as C, replacing characters in the binary software code may cause memory misalignment. In these or other cases, the software service platform can determine whether replacement is feasible by determining the length of the text strings representing the network address. If the text string has at least two null bytes at the end, replacing the characters in the text string with a secure network protocol, e.g., replacing "HTTP" with "HTTPS", or replacing "FTP" with "FTPS" or "SFPT", would increase the length of the non-null characters in the text string by one, and thus still leave sufficient space for at least one null byte. In such a case, the software service platform can proceed to perform the replacement. On the hand, if the text string has only one null byte at the end, performing the replacement would take away the space for the null byte, and thus create misalignment. In such a case, the software service platform may refrain from making the replacement for this network address. Alternatively, the software service platform can register a network address shortener (e.g., a URL shortener) for the network address that is accessed using an insecure network protocol. The network address shortener can be registered at servers that provide URL shortener services to public, subscribed members, or private members. The network address shortener can redirect an access attempt to the original network address. By using a network address shortener that is shorter than the original network address, there can be enough space to fit the replacement characters without causing memory misalignment.

In some cases, the software service platform can include the information of the patching process in the security notification after performing the patch. The information of the patching process can include the network addresses that have been patched and the network addresses that have not been patched, and the reasons that these network addresses that have not been patched, e.g., cannot be accessed using the secure protocol or patching may cause misalignment. The software service platform can send the patched binary software code to the software developer along with the security notification. Alternatively, the software service platform can send the information of the patching process to the software developer and wait for a patch command. The software developer can send a patch command. In response, the software service platform can perform the patch. In some cases, security policies can be configured at the software service platform. The security policies can indicate whether binary software code from a particular software developer is to be patched with a patch command from the software developer or without a patch command from the software developer.

In some cases, the software service platform can perform additional security procedures, e.g., regenerating digital signature of the binary software code after patching, and replace the original digital signature with the regenerated digital signature. Alternatively, the software service platform can send a notification to the software developer, requesting a new digital signature on the patched binary software code.

While the steps of method 200 are discussed from the perspective of a software service platform, some or all of these steps can be implemented on other devices. For example, the steps of identifying the network addresses that are accessed using an insecure network protocol, determining whether these network addresses can be accessed using a corresponding secure network protocol, generating the security notification, patching the binary software code by replacing the insecure network protocol with a corresponding secure network protocol, or any combinations thereof can be performed by any computing device that analyzes or executes the binary software code.

FIG. 3 is a high-level architecture block diagram showing a computer 302 coupled with a network 350, according to an implementation. The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The network 350 facilitates communications between the computer 302 and other devices. In some cases, a user, e.g., an administrator, can access the computer 302 from a remote network. In these or other cases, the network 350 can be a wireless or a wireline network. In some cases, a user can access the computer 302 locally. In these or other cases, the network 350 can also be a memory pipe, a hardware connection, or any internal or external communication paths between the components.

The computer 302 includes a computing system configured to perform the algorithm described in this disclosure. For example, the computer 302 can be used to implement the network protocol analyzer 122 shown in FIG. 1. The computer 302 can also be used to implement other computing devices, e.g., the software developer device 160 or the client device 102 shown in FIG. 1. In some cases, the algorithm can be implemented in an executable computing code, e.g., C/C++ executable codes. Alternatively, or in combination, the algorithm can be implemented in an application program, e.g., EXCEL. In some cases, the computer 302 can include a standalone LINUX system that runs batch applications. In some cases, the computer 302 can include mobile or personal computers that run the application program.

The computer 302 may include an input device, such as a keypad, keyboard, touch screen, microphone, speech recognition device, or another device that can accept user information, and/or an output device that conveys information associated with the operation of the computer 302, including digital data, visual and/or audio information, or a GUI.

The computer 302 can serve as a client, network component, a server, a database or other persistency, or the like. In some implementations, one or more components of the computer 302 may be configured to operate within a cloud-computing-based environment.

At a high level, the computer 302 is an electronic computing device operable to receive, transmit, process, store, or manage data and information. According to some implementations, the computer 302 may also include or be communicably coupled with an application server, e-mail server, web server, caching server, streaming data server, business intelligence (BI) server, and/or other server.

The computer 302 can receive requests over network 350 from a client application (e.g., executing on a user device) and respond to the received requests by processing said requests in an appropriate software application. In addition, requests may also be sent to the computer 302 from internal users (e.g., from a command console or by another appropriate access method), external or third parties, other automated applications, as well as any other appropriate entities, individuals, systems, or computers.

Each of the components of the computer 302 can communicate using a system bus 303. In some implementations, any and/or all the components of the computer 302, both hardware and/or software, may interface with each other and/or the interface 304 over the system bus 303, using an application programming interface (API) 312 and/or a service layer 313. The API 312 may include specifications for routines, data structures, and object classes. The API 312 may be either computer language-independent or -dependent and refer to a complete interface, a single function, or even a set of APIs. The service layer 313 provides software services to the computer 302. The functionality of the computer 302 may be accessible for all service consumers using this service layer. Software services, such as those provided by the service layer 313, provide reusable, defined business functionalities through a defined interface. For example, the interface may be software written in JAVA, C++, or other suitable language providing data in Extensible Markup Language (XML) format or other suitable format. While illustrated as an integrated component of the computer 302, alternative implementations may illustrate the API 312 and/or the service layer 313 as stand-alone components in relation to other components of the computer 302. Moreover, any or all parts of the API 312 and/or the service layer 313 may be implemented as child or sub-modules of another software module or hardware module, without departing from the scope of this disclosure.

The computer 302 includes an interface 304. Although illustrated as a single interface 304 in FIG. 3, two or more interfaces 304 may be used according to particular needs, configurations, or particular implementations of the computer 302. The interface 304 is used by the computer 302 for communicating with other systems in a distributed environment connected to the network 350 (whether illustrated or not). Generally, the interface 304 comprises logic encoded in software and/or hardware in a suitable combination and operable to communicate with the network 350. More specifically, the interface 304 may comprise software supporting one or more communication protocols associated with communications such that the network 350 or interface's hardware are operable to communicate physical signals.

The computer 302 includes a processor 305. Although illustrated as a single processor 305 in FIG. 3, two or more processors may be used according to particular needs, configurations, or particular implementations of the computer 302. Generally, the processor 305 executes instructions and manipulates data to perform the operations of the computer 302. In some cases, the processor 305 can include a data processing apparatus.

The computer 302 also includes a memory 306 that holds data for the computer 302. Although illustrated as a single memory 306 in FIG. 3, two or more memories may be used according to particular needs, configurations, or particular implementations of the computer 302. While memory 306 is illustrated as an integral component of the computer 302, in alternative implementations, memory 306 can be external to the computer 302.

The application 307 comprises an algorithmic software engine providing functionality according to particular needs, configurations, or particular implementations of the computer 302. Although illustrated as a single application 307, the application 307 may be implemented as multiple applications 307 on the computer 302. In addition, although illustrated as integral to the computer 302, in alternative implementations, the application 307 can be external to the computer 302.

There may be any number of computers 302 associated with, or external to, the system 300 and communicating over network 350. Further, the terms "client," "user," and other appropriate terminology may be used interchangeably, as appropriate, without departing from the scope of this disclosure. Moreover, this disclosure contemplates that many users may use one computer 302, or that one user may use multiple computers 302.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM), or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media, transitory or non-transitory, suitable for storing computer program instructions and data include all forms of non-volatile memory, media and memory devices, including by way of example, semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to, or represent, the functions of the web browser.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a transitory or non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

What is claimed is:

1. A computer-implemented method, comprising:
   receiving, by at least one hardware processor, a binary software code;
   scanning, by the at least one hardware processor, the binary software code to determine whether the binary software code comprises one or more network addresses to be accessed by the binary software code, wherein the scanning comprises identifying one or more text strings in the binary software code, and each of the one or more text strings corresponds to a network address in the one of more network addresses;

for each of the one or more network addresses that are accessed by the binary software code: determining, by the at least one hardware processor and based on the text string that corresponds to the network address, whether the binary software code uses an insecure network protocol to access the network address; and generating, by the at least one hardware processor, a security notification indicating the network address that is accessed by the binary software code using the insecure network protocol.

2. The method of claim 1, wherein the insecure network protocol is one of a Hypertext Transfer Protocol (HTTP) or a File Transfer Protocol (FTP).

3. The method of claim 1, further comprising:

for each network address that is accessed by the binary software code using the insecure network protocol, determining whether the network address can be accessed by using a secure network protocol; and wherein the security notification indicates whether the network address can be accessed by using the secure network protocol.

4. The method of claim 3, wherein the secure network protocol is one of a Hypertext Transfer Protocol Secure (HTTPS), File Transfer Protocol Secure (FTPS), or a Secure File Transfer Protocol (SFTP).

5. The method of claim 3, wherein determining whether the network address can be accessed by using the secure network protocol comprises:

transmitting an access request to the network address by using the secure network protocol;

receiving an access response from the network address; and determining whether the network address can be accessed by using the secure network protocol based on the access response.

6. The method of claim 1, further comprising:

for each network address that is accessed by the binary software code using the insecure network protocol: patching the binary software code by replacing the insecure network protocol with a secure network protocol to access the network address.

7. The method of claim 1, wherein determining that the binary software code accesses one or more network addresses comprises:

determining a configuration of the binary software code;

based on the configuration, extracting a segment of the binary software code, wherein the segment of the binary software code comprises constant values used by the binary software code; and identifying the one or more network addresses based on the constant values in the extracted segment of the binary software code.

8. The method of claim 7, wherein the configuration of the binary software code is object code, executable code, or bytecode.

9. A server, comprising:

at least one hardware processor; and one or more computer-readable storage media coupled to the at least one hardware processor and storing programming instructions for execution by the at least one hardware processor, wherein the programming instructions, when executed, cause the at least one hardware processor to perform operations comprising:

receiving, by at least one hardware processor, a binary software code;

scanning, by the at least one hardware processor, the binary software code to determine whether the binary software code comprises one or more network addresses to be accessed by the binary software code, wherein the scanning comprises identifying one or more text strings in the binary software code, and each of the one or more text strings corresponds to a network address in the one of more network addresses;

for each of the one or more network addresses that are accessed by the binary software code: determining, by the at least one hardware processor and based on the text string that corresponds to the network address, whether the binary software code uses an insecure network protocol to access the network address; and generating, by the at least one hardware processor, a security notification indicating the network address that is accessed by the binary software code using the insecure network protocol.

10. The server of claim 9, wherein the insecure network protocol is one of a Hypertext Transfer Protocol (HTTP) or a File Transfer Protocol (FTP).

11. The server of claim 9, the operations further comprising:

for each network address that is accessed by the binary software code using the insecure network protocol, determining whether the network address can be accessed by using a secure network protocol; and wherein the security notification indicates whether the network address can be accessed by using the secure network protocol.

12. The server of claim 11, wherein the secure network protocol is one of a Hypertext Transfer Protocol Secure (HTTPS), File Transfer Protocol Secure (FTPS), or a Secure File Transfer Protocol (SFTP).

13. The server of claim 11, wherein determining whether the network address can be accessed by using the secure network protocol comprises:

transmitting an access request to the network address by using the secure network protocol;

receiving an access response from the network address; and determining whether the network address can be accessed by using the secure network protocol based on the access response.

14. The server of claim 9, the operations further comprising:

for each network address that is accessed by the binary software code using the insecure network protocol: patching the binary software code by replacing the insecure network protocol with a secure network protocol to access the network address.

15. The server of claim 9, wherein determining that the binary software code accesses one or more network addresses comprises:

determining a configuration of the binary software code;

based on the configuration, extracting a segment of the binary software code, wherein the segment of the binary software code comprises constant values used by the binary software code; and identifying the one or more network addresses based on the constant values in the extracted segment of the binary software code.

16. The server of claim 15, wherein the configuration of the binary software code is object code, executable code, or bytecode.

17. One or more non-transitory computer-readable media containing instructions which, when executed, cause a computing device to perform operations comprising:

receiving, by at least one hardware processor, a binary software code;

scanning, by the at least one hardware processor, the binary software code to determine whether the binary software code comprises one or more network addresses to be accessed by the binary software code, wherein the scanning comprises identifying one or more text strings in the binary software code, and each of the one or more text strings corresponds to a network address in the one of more network addresses;

for each of the one or more network addresses that are accessed by the binary software code: determining, by the at least one hardware processor and based on the text string that corresponds to the network address, whether the binary software code uses an insecure network protocol to access the network address; and generating, by the at least one hardware processor, a security notification indicating the network address that is accessed by the binary software code using the insecure network protocol.

18. The one or more computer-readable media of claim 17, wherein the insecure network protocol is one of a Hypertext Transfer Protocol (HTTP) or a File Transfer Protocol (FTP).

19. The one or more computer-readable media of claim 17, the operations further comprising:

for each network address that is accessed by the binary software code using the insecure network protocol, determining whether the network address can be accessed by using a secure network protocol; and wherein the security notification indicates whether the network address can be accessed by using the secure network protocol.

20. The one or more computer-readable media of claim 19, wherein the secure network protocol is one of a Hypertext Transfer Protocol Secure (HTTPS), File Transfer Protocol Secure (FTPS), or a Secure File Transfer Protocol (SFTP).

* * * * *